United States Patent Office 3,207,583
Patented Sept. 21, 1965

3,207,583
PREPARATION OF TECHNICAL GRADE
RED PHOSPHORUS
Rudolf Gerardus Brautigam, Elmhurst, N.Y., and John T. Nanney, Metuchen, N.J., assignors, by mesne assignments, to The American Agricultural Chemical Company, a corporation of Delaware
No Drawing. Filed Mar. 28, 1963, Ser. No. 268,568
6 Claims. (Cl. 23—223)

This invention relates to technical grade red phosphorus. More particularly, this invention relates to a method of converting technical grade yellow phosphorus to technical grade red phosphorus. Still more particularly, this invention relates to a process for converting technical grade yellow phosphorus to technical grade red phosphorus by heat treatment in a closed system. Technical grade phosphorus, such as technical grade yellow phosphorus and technical grade red phosphorus, is phosphorus with an impurity content in the range about 0.1–1.0% by weight.

It has been the practice to produce technical grade red phosphorus on a commercial scale by a batch type operation wherein technical grade yellow phosphorus is heat treated in a converter for a period of time of about three days. The resulting converted red phosphorus is then removed from the converter, pulverized under water, treated with alkali to remove any unconverted yellow phosphorus, filtered and dried in a vacuum.

The above-described operations carried out subsequent to the heat treatment conversion operation are necessary in order to obtain a red phosphorus product substantially free of yellow phosphorus. The overall sequence of operations, however, is time-consuming and adds considerably to the cost of the red phosphorus product.

The conversion of yellow phosphorus to red phosphorus is an exothermic reaction and tends to be autocatalytic. Also, yellow phosphorus oxidizes very rapidly when exposed to contact with an oxygen-containing gas, such as air. Accordingly, the conditions under which the conversion of yellow phosphorus to red phosphorus take place must be carefully controlled.

It is an object of this invention to provide an improved process for converting technical grade yellow phosphorus to technical grade red phosphorus.

It is another object of this invention to provide a method for producing technical grade red phosphorus from technical grade yellow phosphorus in a closed system by heat treatment where the heat treatment comprises several stages, a first stage in which the temperature of the mass of phosphorus is gradually raised to a level at which the conversion to red phosphorus takes place at a substantial rate and the temperature maintained at or about that level, a second stage where the phosphorus undergoing heat treatment is heated to a more elevated temperature level and maintained at or above that level for a sufficient period of time so as to complete the conversion of yellow phosphorus to red phosphorus, a third stage in which the converted phosphorus is gradually cooled to an intermediate temperature and a fourth stage where the mass of converted phosphorus is cooled to room temperature and removed as product from the system.

How these and other objects of this invention are accomplished will become apparent with reference to the accompanying disclosure.

The foregoing and other objects are obtained in accordance with the practice of this invention involving operations wherein a mass of technical grade yellow phosphorus is disposed in a suitable closed container provided with a nitrogen or other suitable inert atmosphere. The mass of yellow phosphorus within the closed container and surrounded by an inert atmosphere is gradually heated, preferably without agitation and under quiescent conditions, to an elevated temperature at which the conversion of the yellow phosphorus to the red phosphorus takes place at a controlled, relatively rapid, rate. The mass of phosphorus within the closed container is held at or above that temperature for a period of time long enough for a substantial portion, preferably a major portion, of the yellow phosphorus to be converted. Thereafter the mass of phosphorus is further heated in the closed container to a temperature of at least about 340° C. and maintained at that temperature until substantially all the yellow phosphorus in the closed container is converted to red phosphorus.

Upon completion of the above-described heat treatment operations, the mass of the heat treated, converted phosphorus, now comprising substantially only red phosphorus, is cooled within the closed container to an intermediate temperature of about 190° C. over an extended period of time. This cooling operation is carried out over an extended period of time so that sufficient time is provided for the comparatively small amount of phosphorus in the vapor state within the closed container to condense and to be transformed to the red phosphorus form. After this cooling operation the mass of converted phosphorus within the closed container is further cooled to about room temperature and removed therefrom. The resulting converted red phosphorus product contains substantially no unconverted yellow phosphorus and, accordingly, purification operations involving chemical treatment with alkali and the like to remove unconverted yellow phosphorus are not required.

Illustrative of the practice of this invention for the conversion of technical grade yellow phosphorus to technical grade red phosphorus, measured amounts of technical grade yellow phosphorus from a batch of filtered material were placed in closed containers providede with a nitrogen atmosphere. These containers were placed in a heating zone, such as an oven, also desirably provided with an inert atmosphere.

The temperature of the phosphorus in the closed containers is raised in a first stage heat treatment from about room temperature to about 275° C., substantially linearly, over a period of about 12 hours. At a temperature of about 275° C. the conversion of yellow phosphorus to red phosphorus takes place at a controllable, relatively rapid rate. The phosphorus within the container is then maintained at a temperature of about 275° C. for a period of about 5 hours. At the end of this period a substantial, desirably major, portion of the phosphorus in the containers is converted to red phosphorus. Following this first stage heat treatment, the phosphorus, still within the closed containers is heated to about 325–340° C., substantially linearly, over a period of about 3 hours and maintained at this elevated temperature for about an additional 3 hours. As a result of this second stage heat treatment substantially all of the phosphorus within the closed containers is converted to red phosphorus, save for the relatively small portion of phosphorus present in vapor form in the ambient atmosphere within the containers.

Following this second stage heat treatment operation the phosphorus in the closed containers is gradually cooled to a lower temperature of about 190° C. substantially linearly over a relatively extended period of time, about 17 hours. This extended cooling period permits the condensation and conversion of any vaporized phosphorus within the closed containers to the solid red phosphorus form. The closed containers and the phosphorus therein are then cooled to about room temperature within the relatively short period of time, such as about an hour, and the containers then opened and the converted red phosphorus removed therefrom as product. The recovered technical grade red phosphorus product is substantially free of unconverted yellow phosphorus, containing less than about 0.01% by weight yellow phosphorus, and, accordingly requires no additional treatment or purification for the removal of unconverted yellow phosphorus therefrom. The purity of the converted red phosphorus, particularly as to yellow phosphorus content, meets the National Military Establishment Specification for stabilized red phosphorus, JAN-P-670 of August 27, 1948.

The above-described sequence of heat treatment operations for the conversion of technical grade yellow phosphorus to technical grade red phosphorus is set forth in tabular form in accompanying Table I as Cycle 1. Other examples of the sequence of heat treatment operations in accordance with this invention for the conversion of technical grade yellow phosphorus to technical grade red phosphorus are presented in tabular form in accompanying Table I as Cycles 2 and 3.

first stage heating or heat treatment operation be carried out at a temperature at which the conversion of yellow phosphorus to red phosphorus takes place at a rapid but controllable rate and such that excessive pressures and temperatures are not generated within the closed containers such that the heat treatment operation becomes hazardous.

Desirably, in accordance with this invention, the first stage heat treatment operation should be carried out so that the phosphorus undergoing treatment is maintained at or above about 275° C. for at least about 5 hours until a substantial or major portion, e.g. an amount in the range 30–80% by weight of the yellow phosphorus, is converted to red phosphorus. Also desirably during the second stage heat treatment the temperature of the phosphorus within the closed containers is gradually raised to a relatively high temperature, at least about 340° C. and maintained at or above about this temperature for a relatively short period of time sufficient to convert all of the phosphorus within the closed containers to red phos-

*Table I*

| Cycle 1 | | Cycle 2 | | Cycle 3 | |
| --- | --- | --- | --- | --- | --- |
| Temp., ° C. | Time Interval in Hours | Temp., ° C. | Time Interval in Hours | Temp., ° C. | Time Interval in Hours |
| 30 to 275 | 12 | 25 to 275 | 22 | 30 to 275 | 12 |
| At 275 | 5 | At 275 | 34 | At 275 | 4 |
| 275 to 340 | 3 | 275 to 340 | 8 | 275 to 355 | 5 |
| At 340 | 3 | At 340 | 1 | At 355 | 2 |
| 320 to 190 | 17 | 340 to 190 | 13 | 355 to 180 | 15 |
| 190 to 40 | 1 | 190 to 40 | 1 | 180 to 40 | 1 |
| Total Time | 41 | Total Time | 79 | Total Time | 39 |

The converted red phosphorus products from Cycles 1, 2 and 3 were pulverized and analyzed for free acid content and for yellow phosphorus content. The results of these analyzes are set forth in accompanying Table II.

*Table II*

| | Cycle 1 | Cycle 2 | Cycle 3 |
| --- | --- | --- | --- |
| Percent Free Acid | 0.01 | 0.01 | 0.025 |
| Percent Yellow Phosphorus | 0.0074 | 0.0078 | 0.013 |

The test results show the conversion of technical grade yellow phosphorus to technical grade red phosphorus having substantially no yellow phosphorus content, i.e. below about 0.01% by weight, by a special sequence of heat treatment operations only in accordance with the invention and within a relatively short period of time, about 40 hours.

It is to be noted that the red phosphorus product obtained in the heat treatment operation in accordance with Cycle 3 of this invention, duration of processing 39 hours, had a yellow phosphorus content slightly greater than 0.01% by weight. Also, the red phosphorus product obtained by the heat treatment operations of Cycle 2, although having a satisfactory low yellow phosphorus content, required about 80 hours of processing. It would appear that the heat treatment operations of Cycles 2 and 3 with respect to time-temperature parameters represent or approach the desired or preferred limiting operational conditions of the practice of this invention with respect to obtaining a converted technical grade red phosphorus product containing substantially no unconverted yellow phosphorus, i.e. a yellow phosphorus content below about 0.01% by weight, and within a relatively short period of time such as below about 80 hours, e.g. duration of the heat treatment operations in the range from about 40 to 80 hours.

With respect to the preferred limiting conditions of the practice of this invention it is desirable that the initial or phorus. The phosphorus within the closed containers is then gradually cooled to a lower temperature, such as a temperature below about 200° C., over an extended period of time, such as at least about 10–13 hours so as to effect condensation and conversion of any vaporized phosphorus within the closed containers to the red phosphorus form.

Any suitable containers may be employed in the heat treatment conversion operation of this invention provided the containers possess sufficient strength during the heat treatment operations to resist rupture. Also, the materials of construction of the containers should be substantially inert with respect to the phosphorus undergoing heat treatment. Suitable materials of construction for the containers include quartz, chemical resistant glasses, stainless steels and the like. Also, as indicated hereinabove, during the heat treatment operation the containers are maintained closed with the phosphorus therein and provided with an inert atmosphere in contact with the phosphorus. A nitrogen atmosphere has been found to be satisfactory. Other inert gases, such as argon, neon, and the like, might also be employed to provide an inert atmosphere. Also, if desired, the containers may be evacuated prior to heat treatment of the phosphorus therein. Accordingly, by inert atmosphere it is meant not only an atmosphere of inert gases, such as nitrogen or argon, but also the absence or substantial absence of an atmosphere.

As may be appreciated from the foregoing, the time and/or temperature of any one stage in the overall sequence heat treatment operations of this invention may be varied providing a compensating change in temperature and/or time is made at another stage.

As will be apparent to those skilled in the art in the light of the foregoing, many modifications, alterations and substitutions are possible in the practice of this invention without departing from the spirit or scope thereof.

We claim:
1. A method of converting technical grade yellow phosphorus to red phosphorus which comprises
   (a) heating a mass of technical grade yellow phosphorus in a closed system and in an inert atmosphere to a first elevated temperature of between at least about 275° C. and less than about 340° C.,
   (b) maintaining said mass of yellow phosphorus at said first elevated temperature for a period of at least about 5 hours to convert a major portion of said yellow phosphorus to red phosphorus.
   (c) thereupon bringing said mass of phosphorus to a second elevated temperature of at least about 340° C.,
   (d) maintaining the mass of phosphorus at a temperature of at least 340° C. for at least about 3 hours to convert substantially all of said mass of phosphorus to red phosphorus,
   (e) cooling the resulting heat treated mass of phosphorus to a relatively low temperature over an extended period of time sufficient to condense and to transform any vaporized yellow phosphorus in the system to red phosphorus, and
   (f) thereupon cooling the resulting red phosphorus to about room temperature and removing the same as product from said system.
2. A method as defined in claim 1 in which said relatively low temperature is about 190° C.
3. A method of converting technical grade yellow phosphorus to red phosphorus which comprises
   (a) heating a mass of technical grade yellow phosphorus in a closed system and in an inert atmosphere from room temperature to a first elevated temperature of between about 275° C. and less than about 340° C.,
   (b) maintaining said mass of phosphorus at said first temperature for a period of time of at least about 5 hours to convert a major portion of said yellow phosphorus to red phosphorus,
   (c) further heating said mass of phosphorus over an extended period of time to a second elevated temperature of at least about 340° C.,
   (d) maintaining the mass of phosphorus at a temperature at least above about 340° C. for at least about one hour to convert substantially all of said mass of phosphorus to red phosphorus,
   (e) cooling the mass of phosphorus to a temperature of about 190° C. over an extended period of time sufficient to condense and to transform any vaporized yellow phosphorus in the system to red phorphorus,
   (f) and thereupon cooling the resulting red phosphorus to about room temperature and removing the phosphorus,
   (g) said steps (b), (c), (d) taking a total time of at least about 11 hours.
4. A method of converting technical grade yellow phosphorus to red phosphorus as defined in claim 3 in which the extended period of time in (e) is at least about 17 hours.
5. A method of converting technical grade yellow phosphorus to red phosphorus as defined in claim 3 in which the total time required for steps (b), (c), (d) and (e) is at least about 25 hours.
6. A method of converting technical grade yellow phosphorus to red phosphorus as defined in claim 3 in which the period of time in step (b) is about 34 hours, in step (d) is about 1 hour and in step (e) is about 13 hours.

References Cited by the Examiner

UNITED STATES PATENTS

| 2,397,951 | 4/46 | De Witt | 23—223 |
| 2,476,335 | 7/49 | Tusson | 23—223 |

MAURICE M. BRINDISI, *Primary Examiner.*